(12) United States Patent
Mattisson et al.

(10) Patent No.: US 8,055,234 B2
(45) Date of Patent: Nov. 8, 2011

(54) METHODS AND APPARATUS FOR SUPPRESSING STRONG-SIGNAL INTERFERENCE IN LOW-IF RECEIVERS

(75) Inventors: Sven Mattisson, Bjärred (SE); Paul Wilkinson Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 674 days.

(21) Appl. No.: 12/147,962

(22) Filed: Jun. 27, 2008

(65) Prior Publication Data

US 2009/0325518 A1    Dec. 31, 2009

(51) Int. Cl.
*H04B 1/16* (2006.01)
(52) U.S. Cl. ............................... 455/296; 455/137
(58) Field of Classification Search ........... 455/67.11, 455/131, 137, 295, 296, 226.1, 230, 323, 455/334, 138, 139, 214, 303
See application file for complete search history.

(56) References Cited

U.S. PATENT DOCUMENTS

| | | | |
|---|---|---|---|
| 4,888,557 A | 12/1989 | Puckette, IV et al. | |
| 5,241,702 A | 8/1993 | Dent | |
| 5,568,520 A | 10/1996 | Lindquist et al. | |
| 5,712,637 A | 1/1998 | Lindquist et al. | |
| 5,749,051 A | 5/1998 | Dent | |
| 6,370,205 B1 | 4/2002 | Lindoff et al. | |
| 6,449,320 B1 | 9/2002 | Lindoff | |
| 6,473,471 B2 | 10/2002 | Lindquist et al. | |
| 6,606,484 B1 | 8/2003 | Faulkner | |
| 7,046,720 B2 | 5/2006 | Lindoff et al. | |
| 7,657,241 B2 * | 2/2010 | Shah | 455/232.1 |
| 7,773,967 B2 * | 8/2010 | Smith | 455/295 |
| 2004/0048576 A1 | 3/2004 | Hildebrand et al. | |
| 2005/0159124 A1 | 7/2005 | Shah | |
| 2007/0184782 A1 | 8/2007 | Sahota et al. | |
| 2009/0075610 A1 * | 3/2009 | Keehr et al. | 455/137 |

FOREIGN PATENT DOCUMENTS

FR    2898746 A1    9/2007

OTHER PUBLICATIONS

Dent, P. W. et al. "Methods and Apparatus for Reducing Own-Transmitter Interference in Low-IF and Zero-IF Receivers." Co-pending U.S. Appl. No. 12/163,248, filed Jun. 27, 2008.
Dent, P. W. et al. "Strong Signal Tolerant OFDM Receiver and Receiving Methods." Co-pending U.S. Appl. No. 12/339,630, filed Dec. 19, 2008.
Dent, P. W. et al. "Own Transmitter Interference Tolerant Transceiver and Receiving Methods." Co-pending U.S. Appl. No. 12/339,726, filed Dec. 19, 2008.
International Search Report for PCT Application No. PCT/EP2009/058054 mailed Feb. 24, 2010.

* cited by examiner

*Primary Examiner* — Blane J Jackson
(74) *Attorney, Agent, or Firm* — Coats & Bennett, P.L.L.C.

(57) ABSTRACT

Circuits and methods are disclosed for compensating for received signal distortion caused by non-linearities in the receiver circuitry. An exemplary receiver circuit includes a distortion waveform generator configured to approximate one or more non-linear response characteristics of a down-converter circuit used to downconvert the received radio frequency signal. The estimated distortion waveform thus produced is filtered, using a filter or filters substantially similar to those used for filtering an intermediate frequency signal that includes the desired signal and non-linear distortion products caused by strong interfering signals. The filtered estimated distortion waveform and the intermediate frequency are sampled, to obtain a sampled distortion signal and a sampled signal of interest. The sampled distortion signal is scaled, and subtracted from the sampled signal of interest to obtain reduced-interference signal samples. In some embodiments, the scaling factor is determined by correlating the sampled signal of interest with the sampled distortion signal.

22 Claims, 6 Drawing Sheets

METHODS AND APPARATUS FOR SUPPRESSING STRONG-SIGNAL INTERFERENCE IN LOW-IF RECEIVERS

TECHNICAL FIELD

The present invention relates generally to wireless receiver systems, and in particular relates to methods and apparatus for suppressing interference in such receivers caused by non-linear distortion from strong interfering signals.

BACKGROUND

In the field of radio receivers, there is a continuing effort to minimize the amount of tuned circuitry used. By reducing the number of tuned circuits, larger portions of the receiver may be integrated, resulting in smaller, and often less expensive, devices. This effort has resulted in widespread interest in homodyne receivers (also known as direct-conversion receivers) and low intermediate frequency (low-IF), or near-zero intermediate frequency (near-zero IF) receivers.

A well-known and common deficiency of some prior art homodyne and low-IF receivers is susceptibility to strong interfering signals. A typical front-end circuit for a radio receiver includes a filter just after the antenna input, with a bandwidth that is often significantly larger than the signal bandwidth for a given signal of interest. As a result, the signal admitted by the antenna bandpass filter may comprise one or more unwanted signals as well as the wanted signal. These unwanted signals may generate intermodulation products, among themselves and with local oscillator leakage signals appearing at the receiver input, due to square-law and higher-order distortion terms in the receiver's radio frequency (RF) circuitry. These intermodulation products may produce corrupting interference in the complex baseband signals.

Those skilled in the art will appreciate that potentially interfering signals may appear at the receiver across a spectrum extending over the total bandwidth of the receiver's RF filter or filters. Second-order (and various higher-order) intermodulation products from these signals may thus overlap the desired downconverted signal when the intermediate frequency is less than the antenna bandwidth. In the case of a homodyne or zero-IF receiver, these interfering signals may manifest themselves as a varying DC offset, which is not easily compensated by the various means commonly employed to compensate a constant DC offset. A varying DC offset is most pronounced when interfering signals are amplitude modulated, or of a bursty type, such as with time-domain multiple access (TDMA) transmissions.

The following patents issued to one of the present inventors disclose compensation of DC offset in homodyne receivers, as well as addressing other practical deficiencies such as slope and other slow drifts: U.S. Pat. No. 5,241,702 to Dent, issued Aug. 31, 1993, entitled "DC Offset Compensation in a Radio Receiver"; U.S. Pat. No. 5,568,520 to Lindquist and Dent, issued Oct. 22, 1996, entitled "Slope, Drift and Offset Compensation in Zero-IF receivers"; U.S. Pat. No. 5,712,637, issued Jan. 27, 1998, a divisional of the above '520 patent; and U.S. Pat. No. 6,473,471, issued Oct. 29, 2002, also a divisional of the above.

Various other patents disclose compensation techniques for DC offsets, including varying DC offsets, in a homodyne receiver. These patents include several issued to Lindoff et al.: U.S. Pat. No. 6,370,205 entitled "Method and Apparatus for Performing DC-Offset Compensation in a Radio Receiver," issued Apr. 9, 2002; U.S. Pat. No. 6,449,320 entitled "Equalization with DC Offset compensation," issued Sep. 10, 2002; and U.S. Pat. No. 7,046,720, entitled "System and Method for DC Offset Compensation in a WCDMA Receiver," issued May 16, 2006.

In addition, U.S. Pat. No. 5,749,051, issued to current applicant Dent on May 5, 1998 and entitled "Compensation for Second Order Intermodulation in a Homodyne Receiver," discloses compensating varying DC offsets caused by strong signals in a homodyne receiver.

All the above mentioned patents are hereby incorporated by reference herein.

Related problems due to strong interfering signals have also been found to apply to non-homodyne, low-IF receivers in which the intermediate frequency is non-zero, but still lower than the total antenna filter bandwidth. In these low-IF receivers, it is still possible for two strong interfering signals within the RF bandwidth of the antenna bandpass filter to produce intermodulation products that spectrally overlap the desired IF signal. These interfering intermodulation products include second-order intermodulation products (or, more generally, even-order products), which arise due to the square-law term in the polynomial expansion of an RF circuit's non-linear transfer function. As is well-known, the square-law term may also be reduced by employing balanced, i.e. push-pull, circuit structures. However, another mechanism that can produce interference is second-order intermodulation between one or more strong received signals, which then proceeds to modulate a local oscillator leakage signal. Local oscillator leakage in RF circuitry is a prime source of DC offset in homodyne receivers in which the local oscillator is directly on the wanted signal frequency. In low-IF receivers, strong interfering signals can effectively modulate the local oscillator leakage signal, producing spectral components that are downconverted to the intermediate frequency.

Interference from this mechanism is proportional to the magnitude of the cubic term in the transfer function non-linearity, which is not reduced by employing balanced structures, but is still a function of second-order intermodulation between the external signals. In effect, one or more strong signals intermodulate using two of the cubic term's powers, the result of which is transferred to own local oscillator leakage via the third power. Both direct second-order intermodulation and the latter mechanism produce interference proportional to second-order intermodulation between external signals.

Although various solutions have been proposed for eliminating or reducing DC-offset problems in homodyne receiver, including those disclosed in the aforementioned U.S. Pat. No. 5,749,051 (hereinafter referred to as "the '051 patent"), further improvements are required to suppress strong signal interference arising through non-linearities in radio receivers using non-zero intermediate frequencies.

SUMMARY

The inventive circuits and methods disclosed herein compensate for unwanted distortion of a received signal in a low-IF receiver caused by non-linearities in the receiver circuitry. In some embodiments of the inventive circuits disclosed herein, a distortion waveform generator comprises non-linear circuitry configured to approximate one or more non-linear response characteristics of a downconverter circuit used to downconvert the received radio frequency signal. The estimated distortion waveform thus produced is filtered, using a filter or filters substantially similar to those used for filtering an intermediate frequency signal that includes the desired signal and one or more non-linear distortion products caused by one or more strong interfering signals. The filtered estimated distortion waveform and the intermediate frequency are sampled, to obtain a sampled distortion signal and a sampled signal of interest. In an exemplary interference subtraction circuit, the sampled distortion signal is scaled, using a scaling factor, and subtracted from the sampled signal of interest to obtain reduced-interference signal samples. In some embodiments, the scaling factor is determined by correlating the sampled signal of interest with the sampled distortion signal. In some of these embodiments, complex distortion signal samples, e.g., distortion signal samples comprising in-phase and quadrature components, are correlated with complex samples of the signal of interest, to obtain a complex scaling factor.

Several variants of a receiver circuit for reducing interference from intermodulation distortion in a receiver are disclosed. Corresponding methods are also disclosed.

DETAILED DESCRIPTION

Figure 1:
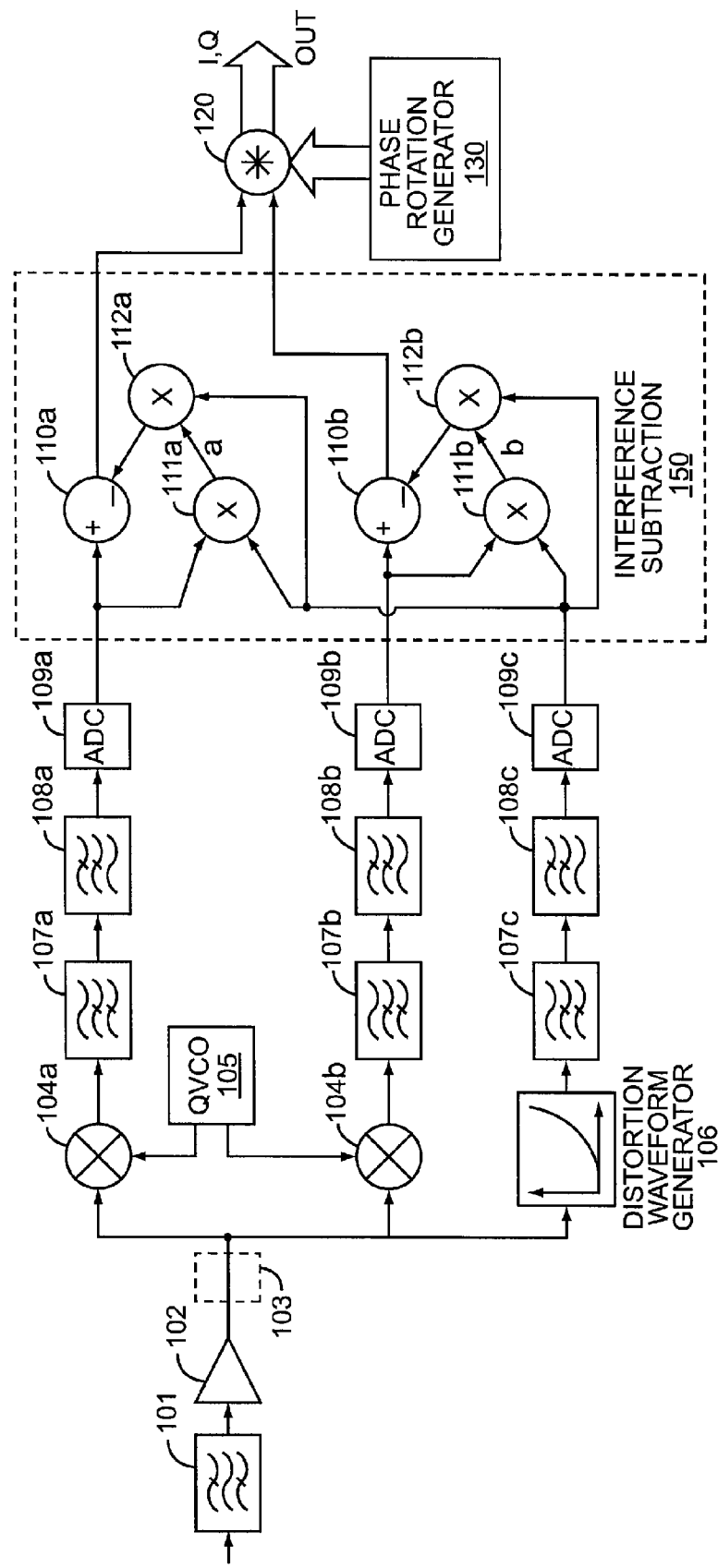
FIGS. 1-4 each illustrate an exemplary receiver circuit according to one or more embodiments of the invention.

The homodyne or direct-conversion receiver may be regarded as a variation of the traditional superheterodyne receiver. A superheterodyne receiver in general receives signals in a first frequency band and mixes the received signals with a locally generated oscillator signal, thus converting them to a second or intermediate-frequency (IF) band. By selecting the local oscillator frequency to be a constant amount away from a desired signal in the first frequency band, the desired signal always appears at the same frequency in the IF band, facilitating its selection by means of a fixed-tuned IF filter.

In the homodyne variation, the chosen "intermediate" frequency band is DC, or zero frequency. The local oscillator must then be tuned to the center of the desired received signal. At the mixer output, modulation on the desired signal, which typically is manifested as spectral components above and below the desired signal center frequency, is "folded." Thus, a signal component at a frequency offset $\Delta f$ above the desired signal's center frequency or $\Delta f$ below the desired signal's center frequency will appear at the mixer output at an absolute frequency of $\Delta f$. To allow the receiver to distinguish between these folded components, quadrature downconversion may be used, where two mixers are provided, using local oscillator signals that are phase offset by 90 degrees. In this case, an upper-sideband signal component A and lower-sideband signal component B will appear in the in-phase and quadrature mixer outputs as I=A+B and Q=j(A−B), respectively. The upper- and lower-sideband components may then easily be separated by forming B=(I+jQ)/2 and A=(I−jQ)/2.

Homodyne receiver operations are described in more detail in U.S. Pat. No. 5,241,702, which was incorporated by reference above. As noted above, homodyne receivers suffer from DC-offset problems. These problems result from the fact that the local oscillator frequency is equal to the desired reception frequency. This results in self-interference due to leakage of the local oscillator signal into the RF input of the downconversion circuit. Because the leakage signal is located precisely on the desired signal center frequency, the interfering component becomes converted to exactly zero frequency, or DC, at the downconverter outputs. The resulting DC offset component may be many orders of magnitude larger than the desired signal. This may, however, be removed by applying the teachings of one or more of the above-referenced patents.

When at least one other strong interfering signals is present at any frequency at the input of a homodyne receiver's downconverter, such signals can be converted to DC by mixing with themselves through any even order distortion terms in the polynomial description of the mixer transfer function. As will be appreciated by those skilled in the art, this effect can be minimized by employing balanced mixer structures and push-pull RF amplifier structures. These techniques generally provide cancellation of even-order distortion, of which the most significant results from the square-law term of the circuit's non-linearities, also known as second-order intermodulation. Nevertheless, signals of sufficient strength can still produce fixed or variable DC offsets due to residual second-order nonlinearities of the downconverter circuit, due to imperfect balance in said balanced structures. In addition, odd-order distortion terms such as the third-order term can allow mixing of at least one strong signal with itself, using the first two orders, to produce a low frequency signal, which then mixes with a local oscillator leakage signal (using the third of the three orders) to impress low frequency modulation upon the local oscillator leakage signal.

This latter mechanism is also proportional to second-order distortion between the strong interfering signals, but arises due to the third-order distortion term in the RF circuit transfer function. Such third-order non-linearities are usually smaller than second-order non-linearities, but since odd-order terms are not suppressed by using balanced or push-pull circuit structures, these third-order distortion terms may be the dominant source of interference.

For example, consider an interfering radio-frequency signal $S_U$ and a local oscillator leakage signal $S_L$, operated upon by a cubic distortion term to produce: $(S_U+S_L)^3=S_U^3+3S_U^2S_L+3S_US_L^2+S_L^3$. Those skilled in the art will appreciate that a potentially damaging term in this expression is $3S_U^2S_L$, as this term may produce an interfering signal at the local oscillator frequency, which may then be downconverted to DC. In effect, $S_U^2$ represents a square-law amplitude detection of the unwanted signal(s) $S_U$, the amplitude then modulating the local oscillator leakage $S_L$ such that it cannot be treated as a constant by a DC offset compensating mechanism. In a homodyne receiver, this may be compensated using the techniques disclosed in the '051 patent.

When a low-IF receiver is used rather than a zero-IF receiver, it is not necessarily the amplitude modulation detected by the term $S_U^2$ which causes the interference, but rather a spectral component of it within the low-IF passband. Further, third-order terms resulting from two interfering signals and the local oscillator leakage may also fall within the low-IF passband. Depending on how low the IF is, these interference components may or may not be suppressed by the techniques disclosed in the '051 patent. Thus, enhancements to the techniques of the '051 patent will now be described reducing such interference, with the aid of FIG. 1.

In the exemplary receiver circuit of FIG. 1, a signal received via an antenna is filtered by antenna filter 101 and amplified by low-noise amplifier 102. In some embodiments the amplified signal is filtered further with an additional radio frequency (RF) filter 103, which is indicated as optional in the circuit of FIG. 1. The amplified received signal is then applied to quadrature mixers 104a and 104b, as well as to the distortion waveform generator 106.

The quadrature mixers 104a and 104b are driven by a quadrature local oscillator, commonly a voltage controlled oscillator controlled by a frequency synthesizer, which is pictured in FIG. 1 as QVCO 105. Unlike the local oscillator in a homodyne receiver, the local oscillator frequency in the circuit of FIG. 1 is not coincident with the carrier frequency or center of the wanted signal channel, but is instead offset by a frequency offset equal to the desired intermediate frequency. A common offset used for low-IF receivers for receiving frequency-multiplexed channels is one-half the channel spacing (i.e., one-half of the frequency separation between adjacent channels in the frequency-multiplexing scheme), which places the local oscillator just outside the signal spectrum on one edge of the desired channel or the other.

Another possible choice of intermediate frequency is an integer multiple of the data symbol transmission rate used in the channel, or an integer multiple of a sub-multiple of the data symbol rate, for example, one-half the symbol rate, one times the symbol rate, 1.5 times the symbol rate, and so on. One advantage of selecting an IF that is related to the symbol rate is that subsequent phase de-rotation of samples of the IF signal may be achieved using short, repetitive, phase sequences.

In a receiver using a non-zero IF, such as the receiver circuit of FIG. 1, a desired signal in the received radio signal is thus converted to an intermediate frequency band that does not include zero frequency. This permits DC offset, which would be troublesome in a homodyne receiver, to be removed by high-pass filters, as shown in FIG. 1 with high-pass filters 107a and 107b.

However, as was discussed above, strong signals can create not only DC offsets but interference covering a range of frequencies, as a result of non-linearities in the mixers 104a and 104b of FIG. 1. As discussed above, this interference may comprise various distortion products of unwanted signals and leakage from the local oscillator signal, and may be due to square-law terms, cubic terms, or higher-order terms in the polynomial expansion of the circuit's non-linearity.

The receiver circuit of FIG. 1 thus includes interference reducing circuitry, including distortion waveform generator 106. Distortion waveform generator 106 effectively mirrors one or more of the non-linear processes in mixers 104a and 104b by which strong, undesired signals are converted to interference that overlaps the signal spectrum. In some embodiments, distortion waveform generator 106 may approximate the non-linearities of mixers 104a and 104b using a device that produces square-law distortion. For example, a mixer circuit similar to that used in mixers 104a and 104b, but with the amplified received signal connected to both the RF input and local oscillator input could be used. Alternatively, a P-N junction or FET transconductance could provide a suitable non-linearity.

More accurate approximations of the non-linear distortion of mixers 104a and 104b may be produced by characterizing the mixer performance and constructing a circuit to replicate the non-linear characteristics of the mixers. This process might begin with measuring the strong signal interference appearing at the outputs of mixers 104a and 104b and plotting the interference versus the strength of the signals on a log/log (i.e. dB/dB) scale. The slope of the resulting plot then indicates the order of the non-linearity involved. An approximation of the non-linearity may then easily be designed using non-linear components such as diodes. In some cases, it may be necessary to match both a square-law term and a cubic term in the polynomial expansion of mixer non-linearities, the square-law term being necessary to estimate the product of a strong signal with itself while the cubic term approximates the product of one or more strong signals with local oscillator leakage.

In some embodiments, distortion waveform generator 106 may comprise two or more separate non-linear functions, e.g., one of which is predominantly a square-law non-linearity and another which is predominantly a cubic non-linearity. In some such embodiments, these separate distortion estimates may be separately processed (e.g., filtered and digitized) and then used to cancel interference to the desired intermediate frequency. In others, the separate distortion signal estimates may be combined before further processing, to produce a multi-term approximation of the interference produced by the receiver's downconverter circuit.

In the discussion that follows, an explanation of how a single non-linear interference signal is processed and subtracted is provided; those skilled in the art will recognize that the described approach may be readily applied to multiple distortion signal estimates produced by separate non-linear functions, e.g. square-law and cubic-law functions, whether the interference estimates are processed separately or together.

In any case, distortion waveform generator 106 approximates one or more components of the interference waveforms appearing at the outputs of mixers 104a and 104b, except that the estimated distortion waveform produced by distortion waveform generator 106 differs from the interference from mixers 104a and 104b by an as-yet-unknown scaling factor.

In the circuit of FIG. 1, the estimated distortion waveform produced by distortion waveform generator 106 is processed in essentially the same manner as the intermediate signals produced by mixers 104a and 104b. Thus, just as the intermediate frequency signals produced by mixers 104a and 104b are filtered by high-pass filters 107a and 107b to remove the unwanted DC components and higher-frequency interference products, so is the interference estimate signal from distortion waveform generator 106 filtered, using an identical (or similar) high-pass filter 107c. The high-pass filtering of each signal relieves the subsequent analog-to-digital converters (ADCs) 109a, 109b and 109c from requiring a dynamic range sufficient to encompass the DC offset component, which would in many cases dominate the signal.

All three signals, i.e., the outputs from mixers 104a and 104b and the output from distortion waveform generator 106 may also be low-pass filtered, to remove signal components above the highest-frequency components of the desired signal spectrum. Accordingly, in some embodiments, low-pass filters 108a, 108b, and 108c are configured to reject signals above a cut-off frequency equal to the IF center frequency plus half the bandwidth of the desired signal. The combined response of each pair of high-pass filter 107 and low-pass filter 108 thus selects the desired signal components, as well as any interference components that spectrally overlap the desired intermediate frequency band. The low-pass filters also allow the sampling rate of ADCs 109a, 109b, and 109c to operate at the lowest possible sampling frequency that meets the Nyquist sampling criterion for the desired signal bandwidth.

Those skilled in the art will appreciate that it is also possible, especially for somewhat higher intermediate frequencies, to use a bandpass filter, or a cascade of two or more filter blocks, with a net response that combines the responses of each pair of high-pass filter 107 and low-pass filter 108. Any of these filters or filter blocks may also be of the poly-phase type, further enhancing the image rejection performance of the receiver circuit. When poly-phase filters are used for any of filters 107*a-b* and 108*a-b*, phase compensation or corresponding poly-phase filtering may be applied to filters 107*c* and 108*c*.

Those skilled in the art will further appreciate that ADCs 109*a-c* may in some cases be bandpass ADCs, operating at a sampling frequency less than the intermediate frequency but greater than the bandpass filter bandwidth. In some embodiments, these bandpass ADCs may be configured to sample the input analog signals at pairs of points spaced by an odd multiple of quarter-periods at the intermediate frequency, thus producing in-phase and quadrature samples. Such "quadrature sampling" is explained in more detail in, for example, U.S. Pat. No. 4,888,557, issued to Puckette et al.

Those skilled in the art will appreciate that in each of the variants of the circuit of FIG. 1 discussed above, the processing performed on the intermediate frequency signals output from mixers 104*a* and 104*b* is also performed on the output of distortion waveform generator 106. Thus, extraneous interference components appearing outside the intermediate frequency band are removed by filters 107*c* and 108*c*. Furthermore, components of the estimated distortion waveform from distortion waveform generator 106 at or near the intermediate frequency experience similar delays and frequency response as seen by the intermediate frequency signals from mixers 104*a* and 104*b*. The result of this similar conditioning of the intermediate frequency signals and the interference estimation signal is that the estimated distortion waveform approximates the interference appearing in the intermediate frequency signal as closely as possible.

After analog-to-digital conversion in ADCs 109*a-c*, the in-phase and quadrature intermediate frequency signals and the estimated distortion waveform are in the numerical domain, and may be collected and stored in memory for non-real-time (i.e. offline) processing by interference subtraction circuit 150, which may comprise one or more digital signal processors, microprocessors, microcontrollers, or other digital hardware. Of course, non-real-time processing is not essential, but is often more convenient, as the system designer need only be concerned that the entire processing is completed within the time available, and need not be so concerned about maintaining the timing between individual parts of an extended synchronous process.

The processing in interference subtraction circuit 150 includes correlating, in correlators 111*a* and 111*b*, the estimated distortion waveform samples from ADC 109*c* with the signal samples from ADCs 109*a* and 109*b*. Correlators 111*a* and 111*b* may operate in various ways, but with the same objective: to determine scaling factors, illustrated as amounts a and b in FIG. 1, indicating how much of the interference signal is appearing in each of the signal paths over a predetermined averaging period.

The distortion signal samples from ADC 109*c* are then scaled by the scaling factors a and b in multipliers 112*a* and 112*b*. The scaled distortion signal samples are subtracted from the in-phase and quadrature samples of the intermediate frequency signal in subtracting circuits 110*a* and 110*b*, respectively. In alternative embodiments, of course, a scaling factor could be applied to the sampled signal of interest, rather than the distortion signal samples. In any event, the resulting interference-reduced samples are further processed to detect and decode data carried by the desired signal.

One method of correlation is to multiply the distortion signal samples by time-corresponding samples of the signal of interest, and summing the products over the averaging period. The resulting sum may, in some embodiments, be normalized by dividing by the number of samples used. Another method of correlation, which is shown in FIG. 1, is to scale the distortion signal samples with initial values for a and b (which may be arbitrary), and subtract the scaled distortion signal samples from the in-phase and quadrature signal samples, using subtracting circuits 110*a* and 110*b*. The resulting samples may then be correlated with the distortion signal samples to determine whether a residual portion of the interference signal estimate remains to be subtracted. The scaling factors a and b may then be updated to drive the residual interference component towards zero. Thus, those skilled in the art will appreciate that the subtraction circuits 110 and correlator circuits can be arranged in ways other than those illustrated in FIG. 1, while still achieving the objective of eliminating as far as possible the interference waveform defined by distortion signal samples produced by ADC 109*c* from the samples of the signal of interest produced by ADCs 109*a* and 109*b*, to obtain interference-reduced samples at the outputs of subtracting circuits 110*a* and 110*b*.

In the embodiment of FIG. 1, these interference-reduced signal samples comprise in-phase and quadrature components that together form a complex number that is rotating (on average) from one sample to the next by an angular phase of $2\pi f_{IF} \cdot \Delta T$, where $f_{IF}$ is the intermediate frequency and $\Delta T$ is the time between samples. This average phase rotation represents phase rotation induced by a carrier signal at the intermediate frequency, and may be removed by conventional phase de-rotation techniques. As shown in the circuit of FIG. 1, for example, the interference-reduced samples may be multiplied, using complex multiplier 120, by phase de-rotation samples $e^{j2\pi i/n}$ produced by phase rotation generator 130. (The value i is an integer index to successive samples, so that sample i receives an effective angular "de-rotation" of $2\pi i/n$.)

In some embodiments $f_{IF}$ and $\Delta T$ are conveniently selected so that $f_{IF} \Delta T$ is the reciprocal of an integer n, so that the phase rotation returns to the same point every n samples. However, this is not required; this merely simplifies the function of phase rotation generator 130 in generating the complex multiplication factor $e^{j2\pi i/n}$. In general, the reciprocal of $f_{IF} \Delta T$ is an integer if both the sample rate and intermediate frequency are selected to be integer multiples of one-half of the symbol rate. However, even if they are not closely related to a symbol rate for the desired signal, $f_{IF} \Delta T$ may still be the ratio m/n of two integers, such that the sequence also repeats after n samples. However, in this case, n may be much longer. In the limit, of course, $f_{IF} \Delta T$ may be an irrational number, in which case a phase-derotation angle may be computed for each sample, rather than being plucked from a look-up-table.

In any case, referring once more to FIG. 1, the progressive phase rotation is removed in complex multiplier 120, where the interference-reduced signal samples, considered as a complex pair, are multiplied by the conjugate of the phase rotation factor to unwind the successive rotation. The result from complex multiplier 120 is an in-phase and quadrature (I,Q) representation of the desired signal, just as if a zero-IF or homodyne receiver had been used, except without the troublesome DC offset component. Furthermore, strong signal intermodulation components may be substantially reduced.

In FIG. 1, phase rotation generator 130 may be clocked (indexed) using the same clock used to drive the sampling in ADCs 109*a-c*. Since the digital processor 150 described above may operate in non-real time, i.e., using buffered samples of the distortion signal samples and the intermediate frequency samples, this simply means that a sample index i beginning at an arbitrary point is associated with successive samples and incremented for each successive sample, for example in the I/O routine that reads samples from the ADCs into the digital processor's memory. In some embodiments, the index may also be a memory address index, assuming samples are stored sequentially in memory. However, the index used for generator 130 may be reduced modulo-n, while a memory address index is not necessarily modulo-reduced by the same modulus, depending on the size of any circular buffer used. Therefore, a separate index i, which is incremented modulo-n, may be maintained in some embodiments, and associated with successive samples.

Those skilled in the art will appreciate that the techniques pictured in FIG. 1 and described above permit receivers to be built with intermediate frequencies that are much lower than half the bandwidth of antenna filter 101. Without the use of these techniques, such a receiver might otherwise be susceptible to, for example, interference from strong signals separated by the intermediate frequency that can pass through antenna 101 and be converted to the intermediate frequency. In conventional superheterodyne receivers, this is traditionally avoided by choosing IF frequencies that are greater than the maximum frequency separation of signals that can pass through antenna filter 101. In other words, conventional superheterodyne receivers use intermediate frequencies that are greater than the bandwidth of the receiver's RF filter or filters. However, as will be appreciated by those in the art, the use of low intermediate frequencies, as enabled by the techniques disclosed herein, has the advantage of permitting an earlier conversion to the digital domain, with a consequent reduction in the number of analog components. This in turn facilitates more efficient integration, and less expensive receivers.

In the preceding description of the receiver circuit of FIG. 1, the importance of treating the output of the distortion waveform generator 106 in the same manner as the intermediate frequency signal was emphasized. Of course, differences in circuit layout and component tolerances in filters 108a-c and 107a-c may cause small differences. These differences may be larger for circuits employing higher intermediate frequencies. In particular, when an intermediate frequency that is substantially higher than the signal bandwidth is selected, and filter pairs 107 replaced with bandpass filters, there can be significant phase shift differences between different bandpass filters. In this case, the scalar interference scaling factors a and b of FIG. 1 may not provide optimal suppression of the interference; an additional phase correction may be required.

Figure 2:
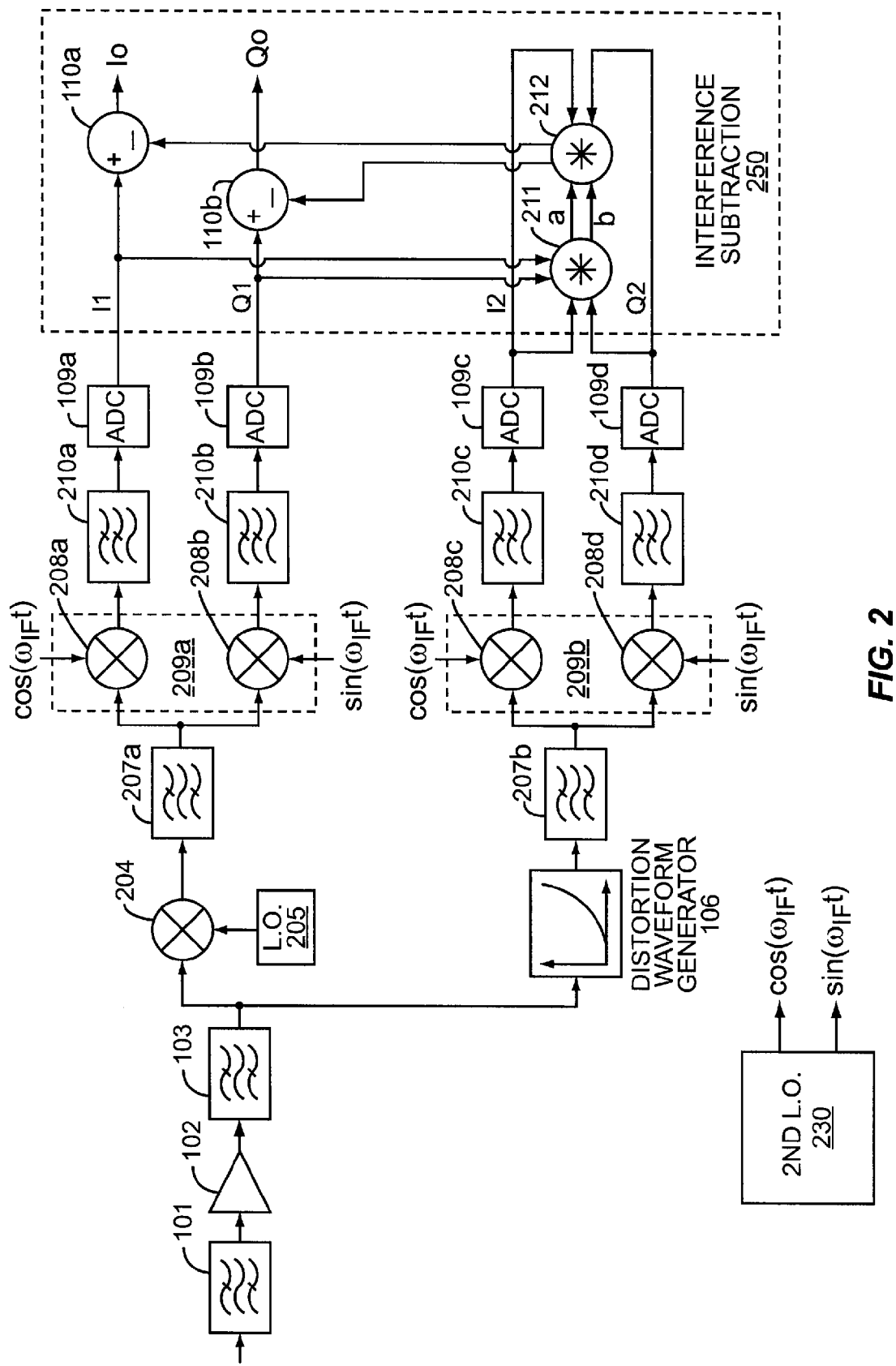

The circuit pictured in FIG. 2 provides an exemplary solution for such a case. FIG. 2 illustrates an exemplary receiver circuit, including elements of a conventional double-superheterodyne receiver. A first mixer 204 converts the input signal amplified by low-noise amplifier 102 to an intermediate frequency. The intermediate frequency in some embodiments may be high enough so that the combination of antenna filter 101 and filter 103 provide adequate image rejection, as in this implementation mixer 204 need not be an image-rejection mixer. Those skilled in the art will appreciate that when mixer 204 is not an image rejection mixer, filter 103 is probably not optional, as it was in the circuit of FIG. 1, but may be required or desirable in order to suppress amplified image noise from low-noise amplifier 102.

Mixer 204 is followed by a bandpass filter 207a tuned to the IF center frequency. In order for filters 101 and 103 to suppress the image response, the IF must be greater than half the combined bandwidth of filters 101 and 103, since the image is twice the IF away from the desired signal, to ensure that the image is outside the RF bandwidth selected by the these RF filters. However, to prevent two input signals falling within the antenna filter bandwidth from mixing, due to second-order non-linearities, to produce a distortion product at the IF, then the IF center frequency should be greater than the whole RF bandwidth. Therefore, there is a range of intermediate frequencies between one-half the RF bandwidth and the RF bandwidth that would still be susceptible to degradation by strong signal non-linear effects. This degradation may be reduced using the interference reduction techniques illustrated in FIG. 2.

As with the receiver circuit of FIG. 1, a distortion waveform generator 106 is provided, in order to "mimic," or approximate, the non-linearities in mixer 204 that permit strong signals to mix and create IF break-through. Distortion waveform generator 106 therefore generates a signal that approximates one or more components of strong-signal interference that appear at the output of mixer 204.

In the receiver circuit of FIG. 1, it was assumed that the IF was low enough that the entire spectrum of interest at the output of mixers 104a and 104b and distortion waveform generator 106 could be digitized using ADCs. However, with the higher IF contemplated for the receiver of FIG. 2, it may be desirable to avoid digitizing the entire spectrum from zero up to the IF, when only a relatively narrow band centered at the IF is of interest. Thus, this band of interest is selected at the output of mixer 204 by IF band-pass filter 207a. Since the estimated distortion waveform from distortion waveform generator 106 should be treated identically to the intermediate frequency signal, an identical (or substantially identical) band-pass filter 207b is provided to filter the estimated distortion waveform produced by distortion waveform generator 106. In other words, filters 207a and 207b are matched as closely as is practical.

If the filters were identically matched, interference suppression could be achieved by simply determining a scaling factor a to be applied to the waveform from filter 207b to obtain a scaled distortion signal for subtracting from the output of filter 207a. However, with the potential of a phase mismatch between filters 207a and 207b, the scaling of the distortion signal should preferably include a phase correction. This may be achieved by using a complex scaling factor, in the form a+jb.

To determine the complex scaling factor a+jb, the signals at the outputs of band-pass filters 207a and 207b may be first converted to complex digital samples, since digital processing is more easily integrated. Thus, in the receiver of FIG. 2, the output of band-pass filter 207a is downconverted to a quadrature baseband using quadrature downconverter 209a, which comprises quadrature mixers 208a and 208b and low-pass filters 210a and 210b. The output of filter 207b is likewise downconverted, using quadrature downconverter 209b, which comprises mixers 208c and 208d, and low-pass filters 210c and 210d. The quadrature downconverters require cosine and sine mixing signals, which may be obtained for both from complex signal generator (second local oscillator) 230. In some embodiments, complex signal generator 230 may be a quadrature voltage-controlled oscillator (QVCO), controlled by a frequency synthesizer loop. In others, complex signal generator may comprise a numerical signal generator using cosine/sine look-up tables. Filter pairs 210a-b and 210c-d may also be implemented as two poly-phase filters, in some embodiments of the invention.

The outputs of each of the four filters 210a-d are digitized using ADCs 109a-d, producing a complex signal pair I1,Q1, corresponding to the in-phase and quadrature samples of the signal of interest, and a complex signal pair I2,Q2, corresponding to in-phase and quadrature samples of the distortion signal. These complex signals are supplied to interference subtraction circuit 250, where complex correlator 211 next correlates the sampled signal of interest (I1,Q1) with the distortion signal samples (I2,Q2), to determine the magnitude and phase, described by the complex correlation result a+jb, of interference in the sampled signal of interest. Complex correlation may be achieved by multiplying samples of the first signal by the complex conjugate of samples of the second signal over a predetermined time period, and averaging the result. Thus:

$$a + jb = \frac{1}{N}\sum_{k=1}^{N}(I1_k + jQ1_k)(I2_k + jQ2_k)^* = \frac{1}{N}\sum_{k=1}^{N}(I1_k + jQ1_k)(I2_k - jQ2_k),$$

for N paired samples $I1_k, Q1_k$ and $I2_k, Q2_k$. Alternatively:

$$a = \frac{1}{N}\sum_{k=1}^{N}(I1_k \cdot I2_k + Q1_k \cdot Q2_k),$$

and $$b = \frac{1}{N}\sum_{k=1}^{N}(I2_k \cdot Q1_k - I1_k \cdot Q2_k).$$

The averaging period used by correlator 211 can in principle be quite long, as it is determining a scaling factor related to the generally static characteristics of mixer 204 and distortion waveform generator 106, i.e., it is determining by what complex factor the signal from non-linear interface estimation circuit 106 differs from the non-linear signals at the output of mixer 204. In general this relationship should not be signal dependent, although it may be temperature or voltage dependent. Thus, in some embodiments it is sufficient to use an averaging period that is perhaps 100-1000 times the reciprocal of the signal bandwidth, so that radio noise is substantially averaged out. Given a Nyquist sampling rate, then averaging the correlation over 200 to 2000 sample pairs may be envisaged.

Those skilled in the art will appreciate that some embodiments of the circuit pictured in FIG. 2 may employ a rolling average, so that the complex scaling factor is continuously updated as new samples become available. Other embodiments may compute a new complex scaling factor for each new set of sample data. Still others may only occasionally compute complex scaling factor, periodically re-computing the scaling factor based on new sample data, to ensure that the relationship between the distortion signal estimate produced by the distortion waveform generator 106 and the interference appearing in the intermediate frequency signal remains under control.

In any case, complex multiplier 212 applies the complex scaling factor a+jb determined by correlator 211 to the interference estimate I2,Q2 to obtain a real part (aI2−bQ2), which is subtracted from the in-phase part of the sampled signal of interest (I1) in subtracting circuit 110*a*, and an imaginary part (bI2+aQ2), which is subtracted from the quadrature component of the sampled signal of interest (Q1) in subtracting circuit 110*b*, to obtain interference-reduced complex signal samples ($I_O, Q_O$).

In the receiver circuit pictured in FIG. 2, the IF was assumed to be such that the image response of first mixer 204 could be suppressed by RF filters 101 and 103. In other words, the IF was assumed to be higher than one-half of the composite bandwidth of these filters. If, however, the IF is selected to be a lower frequency, then the image response would instead need to be suppressed by using an image rejection mixer instead of a simple mixer 204. This is illustrated in the receiver circuit of FIG. 3.

Figure 3:
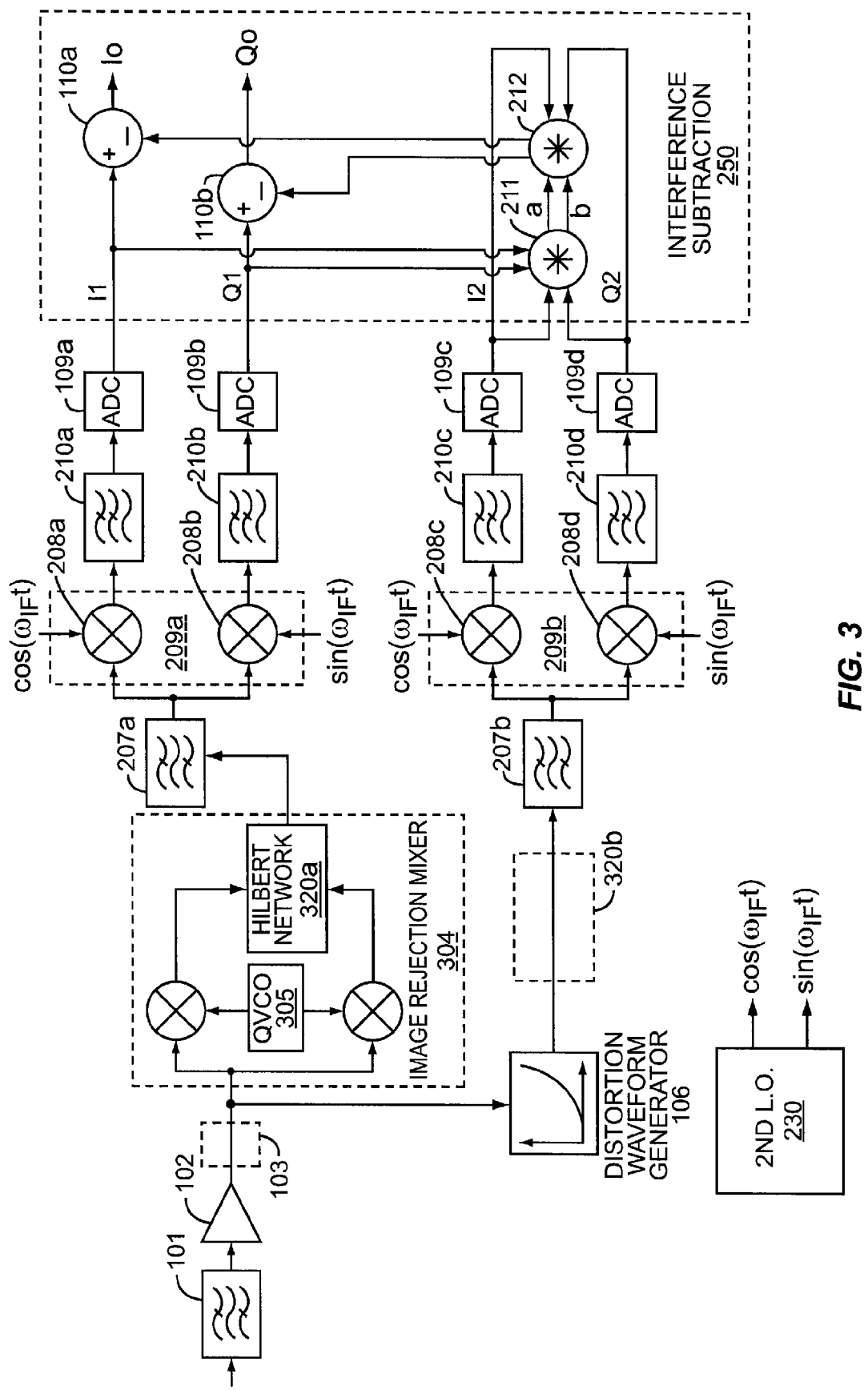

In the circuit of FIG. 3, a second bandpass filter 103, after the low-noise amplifier 102, once again becomes optional. Image noise from low-noise amplifier 102 may instead be suppressed by use of an image rejection mixer 304, which comprises a pair of mixers, driven in quadrature by a quadrature voltage-controlled oscillator 305. The outputs of the quadrature mixers are combined using a Hilbert network 320*a*. The Hilbert network 320*a* combines the output of the two mixers with a relative 90-degree phase shift over the band of interest, i.e., the IF bandwidth of the wanted signal. For example, it may apply a +45 degree phase shift to the signal from one mixer, and a −45 degree phase shift to the other mixer signal, before adding them. The summed signal comprises the desired downconverted signal, with any image signal suppressed. In addition, the summed signal includes non-linear interference due to strong signal breakthough, as a result of the distortion mechanisms described earlier.

In adherence to the principle of treating the interference estimate from distortion waveform generator 106 the same as the desired signal, a copy of the Hilbert network 320*a* may be provided (as shown at 320*b*) in the interference path. In this case, both inputs of the Hilbert network would be connected to the output of non-linear function 106. However, this is not necessary if the Hilbert network 320*a* provides a constant phase shift for both mixer signals over the IF bandwidth. A constant phase shift difference between the signal path and the interference path is captured by the complex correlation process at correlator 211; it is thus unnecessary to have a Hilbert network 320*b* in the interference path to ensure phase matching.

This operation may be explained mathematically as follows. Suppose the non-linear distortion products from the upper mixer of image rejection mixer 304 includes a distortion signal D, in the intermediate frequency band, which is scaled by $\alpha$ and changed in phase by $\theta$ in Hilbert network 320*a*. Suppose further that the same distortion term appears in the lower mixer of image rejection mixer 304, apart from being scaled by $\beta$ and changed in phase by $\phi$. Then the combined distortion of both mixers presented to bandpass filter 207*a* may be given as $D(\alpha \cdot e^{j\theta} + \beta \cdot e^{j\phi})$. However, if there are no other amplitude or phase differences between the intermediate frequency signal processing and the estimated distortion waveform processing, then the term $\alpha \cdot e^{j\theta} + \beta \cdot e^{j\phi}$ is simply the complex scaling factor a+jb determined by correlator 211. A more complex solution would thus only need to be considered if the distortion from the two mixers could be characterized simply as different scalings of the same waveform. In such a case, two or more distinct non-linear functions may need to be approximated by distortion waveform generator 106, in order to mimic separate non-linearities for each mixer.

Figure 4:
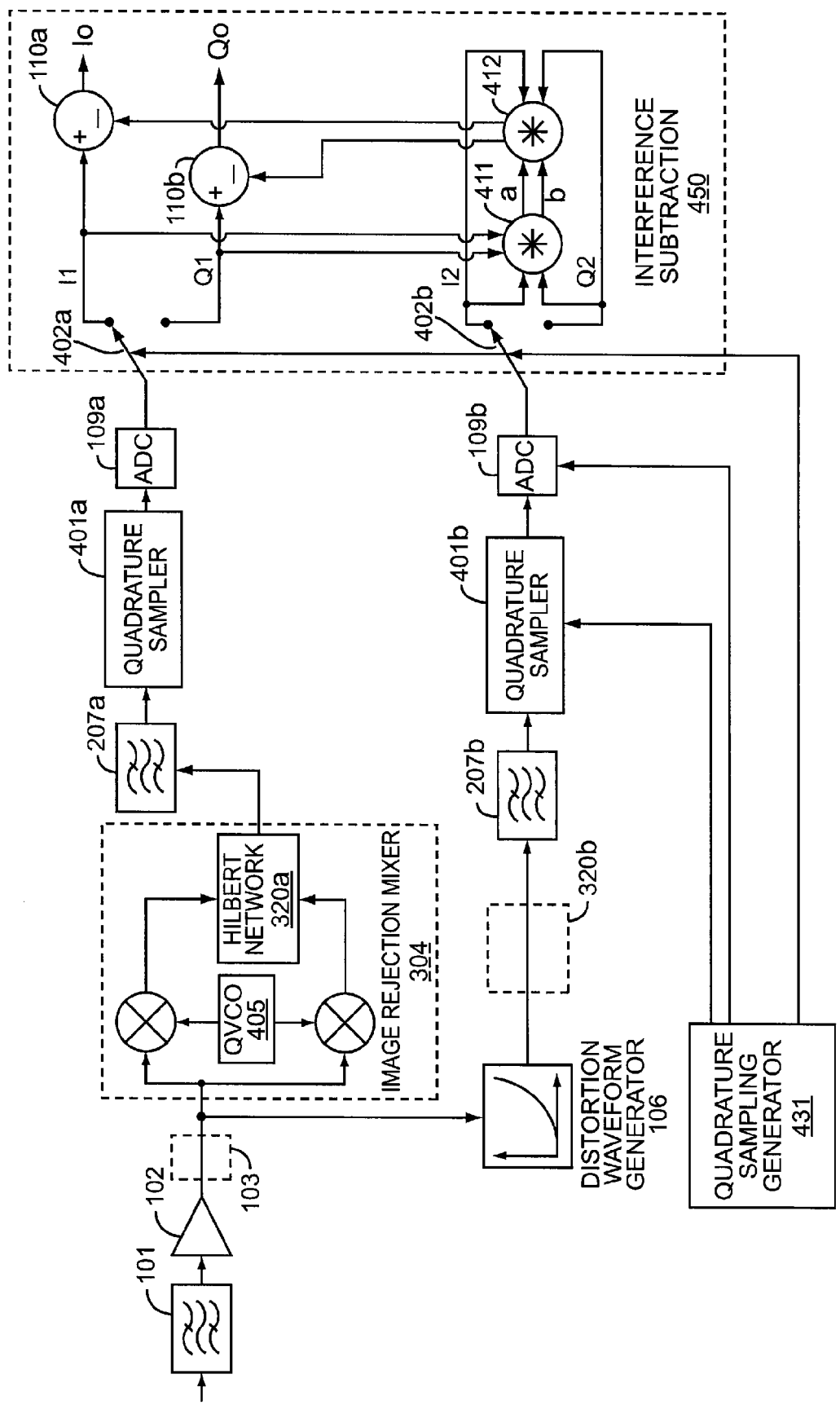

FIG. 4 illustrates another exemplary receiver circuit that is similar to circuit of FIG. 3, but using quadrature bandpass samplers 401*a* and 401*b* in place of the quadrature downconverters of FIG. 3. Those skilled in the art will appreciate that the receiver of FIG. 4 is similar to the receiver of FIG. 3, up to the outputs of band-pass filters 207*a* and 207*b*. However, in the exemplary receiver of FIG. 4, the outputs of filters 207*a* and 207*b* are input to quadrature samplers 401*a* and 401*b*.

These quadrature samplers 401*a* and 401*b* receive timing signals from quadrature sampling generator 431. The timing signals ensure that samples are taken in pairs, each pair preferably separated by a whole number of cycles of the intermediate frequency, and that each member of the pair is separated from the other by an odd number of quarter cycles. Thus, cosine (in-phase) and sine (quadrature) components of the IF signal are sampled alternately, and digitized by ADCs 109*a* and 109*b*. Interference subtraction circuit 450 includes demultiplexing switches 402*a* and 402*b*, which may be synchronized by quadrature sampling generator 431, to separate the digitized samples into I and Q sample pairs for complex number processing at complex correlator 411 and complex multiplier 412.

Although not shown, such processing can include, as is known in the art, a "de-skewing" operation, which compensates for the fact that I and Q are not sampled at the same instant. This may be done, for example, by interpolating between successive I values and between successive Q values to a common sampling instant in between.

Using FIGS. 1 to 4, several variants of a receiver circuit configured to reduce interference from intermodulation distortion have been described. Each of these circuits provides means by which strong-signal interference effects in near-zero-intermediate frequency radio receivers may be compensated. Of course, those skilled in the art will appreciate that the illustrations are not necessarily exhaustive, and many variations may be made by a person skilled in the art without departing from the scope of the invention as described by the attached claims.

Figure 5:
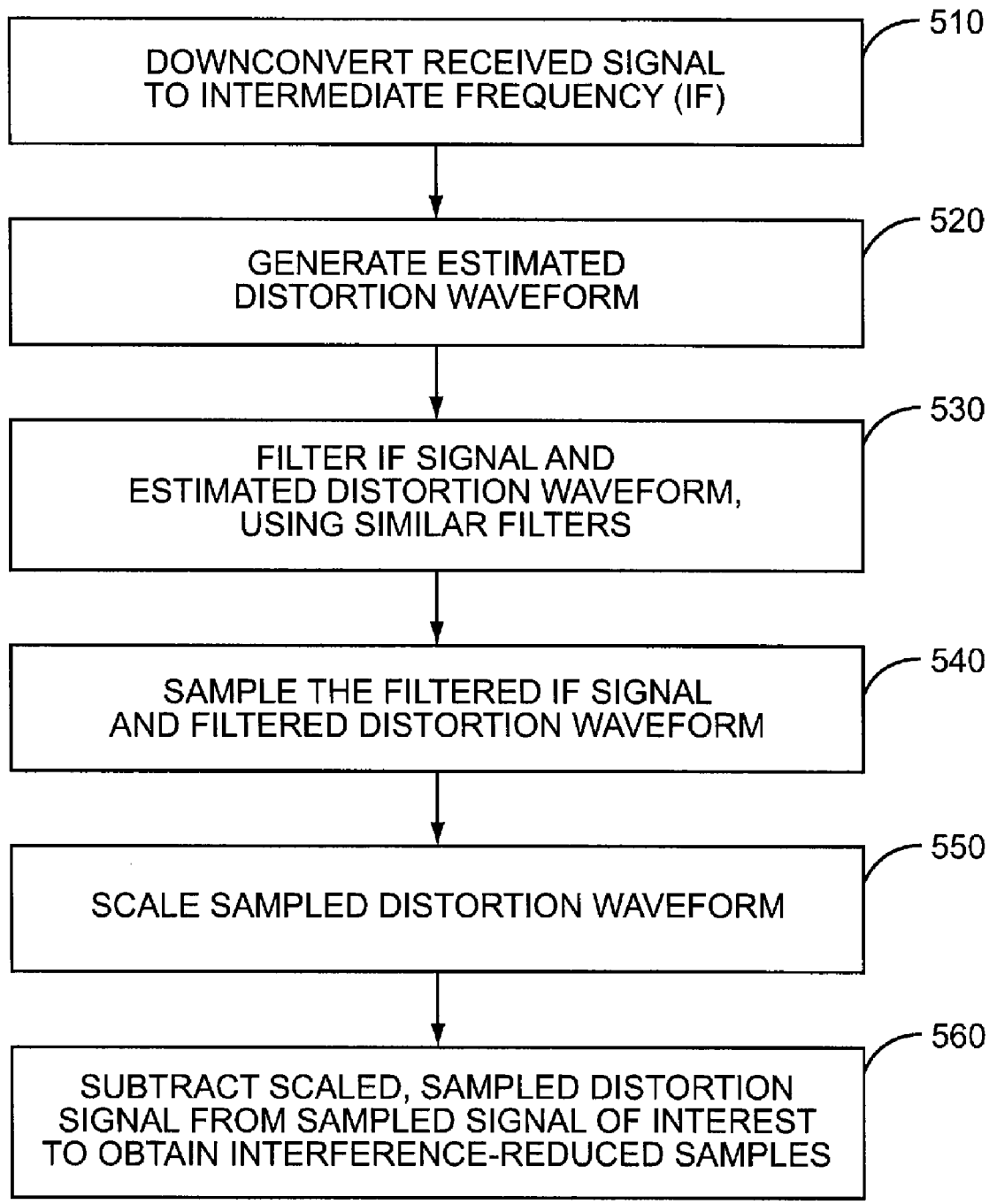
FIG. 5 illustrates an exemplary method for reducing interference from intermodulation distortion in a receiver.

With that in mind, FIG. 5 illustrates an exemplary method for reducing interference from intermodulation distortion in a receiver. Those skilled in the art will recognize that the method illustrated in FIG. 5 may be implemented using various embodiments of the receiver circuits described above.

The method of FIG. 5 begins at block 510, with the downconversion of a received RF signal to an intermediate frequency. Those skilled in the art will appreciate that a quadrature downconverter may be used in some embodiments, in which case the intermediate frequency signal may comprise an in-phase part and a quadrature part. In other embodiments a single mixer may be used at this stage, or an image rejection mixer may be used, resulting in a single intermediate frequency signal. In any event, as discussed above, the received RF signal may comprise one or more interfering signals; as a result, the resulting intermediate frequency signal may include one or more intermodulation products of the interfering signals at or near the intermediate frequency.

At block 520, an estimated distortion waveform is generated, to approximate one or more of these intermodulation products. As was discussed above in reference to FIG. 1, the estimated distortion waveform may be generated by a non-linear circuit configured to approximate one or more non-linear response characteristics of the downconverter circuit. In some embodiments, the non-linear circuit may comprise two or more separate non-linear functions, e.g., one that produces a square-law non-linearity and another that produces a third-order non-linearity. In other embodiments, a single non-linear circuit, e.g., a non-linear circuit that produces a dominant square-law non-linearity, may be sufficient.

In any event, at block 530, the intermediate frequency signal and the estimated distortion waveform are each (separately) filtered, using identical (or substantially similar) filters. Thus, the phase and amplitude response experienced by the intermediate frequency signal is also imposed on the estimated distortion waveform. At block 540, the filtered intermediate frequency signal and the filtered distortion waveform are sampled, to obtain a sampled signal of interest and a sampled distortion signal, respectively. As those skilled in the art will appreciate, especially in view of the various circuits described above, a number of approaches to sampling the intermediate frequency signal and the estimated distortion waveform may be used. For example, in some embodiments, particularly those employing low intermediate frequencies, the intermediate frequency signal (which may comprise in-phase and quadrature parts) may be sampled and digitized at the intermediate frequency, using an analog-to-digital converter with an appropriate sampling bandwidth. In these embodiments, a similar analog-to-digital converter is also used to digitize the distortion waveform.

In other embodiments the filtered intermediate frequency signal may be sampled using a quadrature sampler operating at the intermediate frequency. The resulting samples of the signal of interest may be digitized with an analog-to-digital converter. In these embodiments, an alternating sequence of in-phase and quadrature samples may be de-multiplexed to produce in-phase and quadrature samples of the distortion waveform. Again, similar circuitry may be employed for the distortion waveform. In still other embodiments, the intermediate frequency signal and the distortion waveform may be downconverted to baseband, using quadrature downconverters, and digitized, resulting in in-phase and quadrature samples of the intermediate frequency signal and of the distortion waveform.

At 550, the sampled distortion waveform is scaled, using a scaling factor. In view of the various receiver circuits discussed above, those skilled in the art will appreciate that such scaling may comprise applying a complex scaling factor to complex samples of the distortion waveform in some embodiments of the invention. In others, a first scaling factor may be applied to the sampled distortion waveform for use in reducing interference in in-phase samples of the signal of interest, while a second scaling factor is applied to the sampled distortion waveform for use in reducing interference in corresponding quadrature samples of the signal of interest.

Finally, at block 560, the scaled distortion signal samples are subtracted from the sampled signal of interest to obtain interference-reduced samples. Again, considering the various circuits discussed above, those skilled in the art will appreciate that this subtraction operation may comprise a single subtraction of a single complex value from a complex signal of interest, or separate subtraction operations for each of an in-phase sample of the signal of interest and a quadrature sample of the signal of interest.

Skilled practitioners will also appreciate that the scaling factor or factors used in the general method pictured in FIG. 5 may be obtained in various ways. One exemplary approach for determining and applying a scaling factor is pictured in FIG. 6. The skilled practitioner will recognize variants of this method that may be implemented using each of the circuits of FIGS. 1-4.

Figure 6:
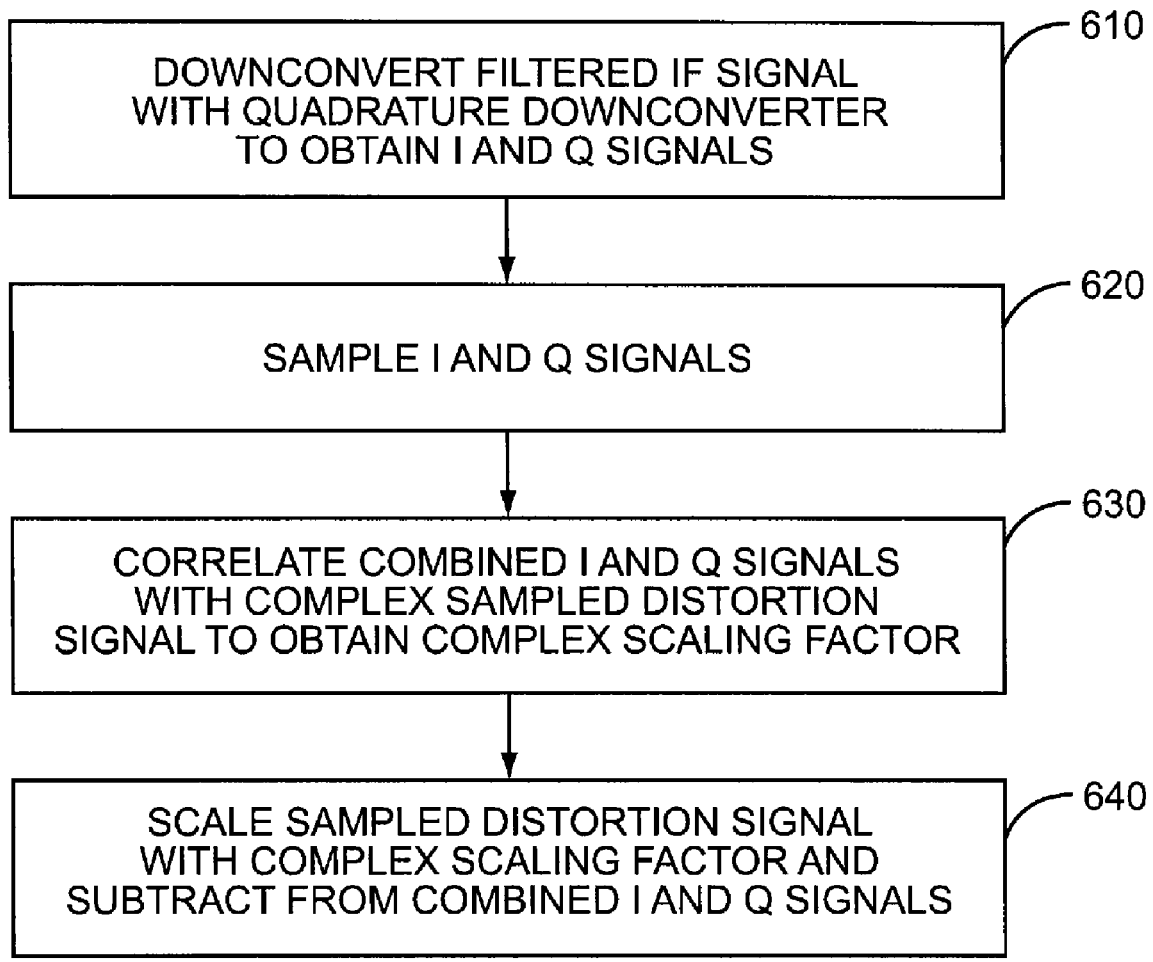
FIG. 6 illustrates an exemplary method for determining a scaling factor for use in removing a sampled distortion signal from a signal of interest.

The method of FIG. 6 begins with processing of a filtered intermediate frequency—thus it is assumed that the operations pictured in blocks 510, 520, and 530 have already taken place. Accordingly, block 610 illustrates the downconversion of the filtered intermediate frequency signal, using a quadrature downconverter, to obtain in-phase and quadrature signals at baseband frequencies. This downconversion may be implemented, for example, using the quadrature downconverters 209 pictured in FIGS. 2 and 3. At block 620, the in-phase and quadrature signals are sampled and digitized, using analog-to-digital converters such as ADCs 109*a-b* in FIGS. 2 and 3.

Corresponding downconversion and sampling operations (not shown) are performed on a distortion waveform. At block 630, the in-phase and quadrature samples of the signal of interest are combined, to form a complex sample, and correlated with a complex representation of the sampled distortion signal to obtain a complex scaling factor. The complex scaling factor is used to produce a scaled sampled distortion signal, as shown at block 640, which is subtracted from the complex samples of the signal of interest.

Those skilled in the art will appreciate that several of the processing steps discussed above may be performed with one or more general-purpose or special-purpose microprocessors, microcontrollers, or digital signal processing units. For example, several of the circuits pictured in FIGS. 1-4, including but not limited to the; correlator circuits 111, 211, 411; complex multiplier circuits 120, 212, and 412; phase rotation generator 130; de-multiplexing switches 402, and subtraction circuits 110, may be implemented with programmable processing units, with hardware logic circuits, or a combination of both. One or more of these circuits may be implemented on an application-specific integrated circuit (ASIC) along with one or more additional circuits pictured in FIGS. 1-4. Further, any of these circuits may be combined with one or more processors and/or hardware configured to control the receiver circuitry and/or to implement a wireless protocol stack according to one or more wireless standards.

Of course, the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A receiver circuit, comprising:
 a downconverter circuit configured to downconvert a received radio frequency signal, comprising a desired signal and one or more interfering signals, to a non-zero intermediate frequency, to obtain an intermediate frequency signal;
 a distortion waveform generator configured to generate an estimated distortion waveform from the one or more interfering signals, without the use of a local oscillator signal, the estimated distortion waveform comprising one or more intermodulation products of the interfering signals at or near the non-zero intermediate frequency;
 first and second filters configured to filter the intermediate frequency signal and the estimated distortion waveform, respectively;
 first and second sampling circuits configured to sample the filtered intermediate frequency signal and the filtered estimated distortion waveform to obtain a sampled signal of interest and a sampled distortion signal, respectively; and
 an interference subtracting circuit configured to combine the sampled distortion signal with the sampled signal of interest to obtain interference-reduced signal samples.

2. The receiver circuit of claim 1, further comprising a bandpass radio frequency filter configured to filter the received radio frequency signal, wherein the non-zero intermediate frequency is less than the bandwidth of the radio frequency filter.

3. The receiver circuit of claim 1, wherein the downconverter circuit is configured to downconvert the desired signal occupying any one of a plurality of channels spaced at a channel separation frequency, and wherein the non-zero intermediate frequency is equal to one-half of the channel separation frequency.

4. The receiver circuit of claim 1, wherein the receiver circuit is configured to process signals having a first data symbol rate, wherein the non-zero intermediate frequency is an integer multiple of one-half of the first data symbol rate.

5. The receiver circuit of claim 1, wherein the distortion waveform generator comprises a non-linear circuit configured to approximate one or more non-linear response characteristics of the downconverter circuit.

6. The receiver circuit of claim 1, wherein the interference subtraction circuit comprises:
 a correlator circuit configured to correlate the sampled signal of interest with the sampled distortion signal to obtain a scaling factor for scaling the sampled distortion signal;
 a scaling circuit configured to scale the sampled distortion signal, using the scaling factor; and
 a subtracting circuit configured to subtract the scaled, sampled, distortion signal from the sampled signal of interest to obtain the interference-reduced signal samples.

7. The receiver circuit of claim 1, further comprising a phase-rotating circuit configured to phase-rotate the interference-reduced signal samples to obtain baseband signal samples.

8. The receiver circuit of claim 1, wherein the first sampling circuit is configured to sample the filtered intermediate frequency signal by sampling the filtered intermediate frequency signal in quadrature to obtain in-phase and quadrature samples of the signal of interest.

9. The receiver circuit of claim 1, further comprising a quadrature downconverter configured to downconvert the filtered intermediate frequency signal to obtain in-phase and quadrature signals, wherein the first sampling circuit is configured to sample the filtered intermediate frequency signal by sampling the in-phase and quadrature signals to obtain in-phase and quadrature samples of the signal of interest.

10. The receiver circuit of claim 9, further comprising a correlating circuit configured to correlate the sampled in-phase and quadrature signals with the sampled distortion signal to obtain first and second scaling factors for scaling the sampled distortion signal.

11. The receiver circuit of claim 9, further comprising a combining circuit configured to combine the in-phase and quadrature samples of the signal of interest to obtain complex signal samples, and a correlating circuit configured to correlate the complex signal samples with the sampled distortion signal to obtain a complex scaling factor for scaling the sampled distortion signal.

12. A method for reducing interference from intermodulation distortion in a receiver, the method comprising:
 downconverting a received radio frequency signal comprising a desired signal and one or more interfering signals to obtain an intermediate frequency signal at a non-zero intermediate frequency;
 generating an estimated distortion waveform from the one or more interfering signals, without using a local oscillator signal, the estimated distortion waveform comprising one or more intermodulation products of the interfering signals at or near the non-zero intermediate frequency;
 filtering the intermediate frequency signal and the estimated distortion waveform with first and second intermediate frequency filters, respectively;
 sampling the filtered intermediate frequency signal and the filtered estimated distortion waveform to obtain a sampled signal of interest and a sampled distortion signal, respectively; and
 combining the sampled distortion signal with the sampled signal of interest to obtain interference-reduced signal samples.

13. The method of claim 12, wherein the non-zero intermediate frequency is less than the bandwidth of one or more bandpass radio frequency filters filtering the received radio frequency signal.

14. The method of claim 12, wherein the desired signal occupies one of a plurality of channels spaced at a channel separation frequency, and wherein the non-zero intermediate frequency is equal to one-half of the channel separation frequency.

15. The method of claim 12, wherein the non-zero intermediate frequency is an integer multiple of one-half of a data symbol rate for the desired signal.

16. The method of claim 12, wherein generating an estimated distortion waveform from the one or more interfering signals comprises applying the one or more interfering signals to a non-linear circuit approximating one or more non-linear response characteristics of a downconverter circuit used to downconvert the received radio signal.

17. The method of claim 12, wherein combining the sampled distortion signal with the sampled signal of interest comprises:
   correlating the sampled signal of interest with the sampled distortion signal to obtain a scaling factor;
   scaling the sampled distortion signal, using the scaling factor; and
   subtracting the scaled, sampled, distortion signal from the sampled signal of interest to obtain the interference-reduced signal samples.

18. The method of claim 12, further comprising phase-rotating the interference-reduced signal samples to obtain baseband signal samples.

19. The method of claim 12, wherein sampling the filtered intermediate frequency signal comprises sampling the filtered intermediate frequency signal in quadrature to obtain in-phase and quadrature samples of the signal of interest.

20. The method of claim 12, further comprising downconverting the filtered intermediate frequency signal with a quadrature downconverter to obtain in-phase and quadrature signals, wherein sampling the filtered intermediate frequency signal comprises sampling the in-phase and quadrature signals to obtain in-phase and quadrature samples of the signal of interest.

21. The method of claim 20, further comprising correlating the sampled in-phase and quadrature signals with the sampled distortion signal to obtain first and second scaling factors for scaling the sampled distortion signal.

22. The method of claim 20, further comprising combining in-phase and quadrature samples of the signal of interest to obtain complex signal samples, and correlating the complex signal samples with the sampled distortion signal to obtain a complex scaling factor for scaling the sampled distortion signal.

* * * * *